United States Patent [19]
Beermann et al.

[11] 3,753,013

[45] Aug. 14, 1973

[54] LIQUID-COOLED ELECTRIC MACHINE, PARTICULARLY TURBO-GENERATOR

[75] Inventors: Heinrich Beermann, Hans Lenting, both of Mulheim-Ruhr, Germany

[73] Assignee: Siemens Aktiengesellschaft, Berlin and Munich, Germany

[22] Filed: July 20, 1971

[21] Appl. No.: 164,367

[30] Foreign Application Priority Data
July 30, 1970   Germany:................. P 20 37 794.0

[52] U.S. Cl................... 310/54, 310/198, 310/206
[51] Int. Cl. .......................................... H02k 9/00
[58] Field of Search .................. 310/54, 53, 58, 59, 310/62, 63, 64, 65, 184, 207, 206, 198, 180

[56] References Cited
UNITED STATES PATENTS

| | | | |
|---|---|---|---|
| 2,970,232 | 1/1961 | Kilbourne............................ | 310/54 |
| 3,594,595 | 7/1971 | Williams............................ | 310/207 |
| 2,934,655 | 4/1960 | Heller................................ | 310/58 |
| 2,975,308 | 3/1961 | Kilbourne.......................... | 310/54 |
| 3,089,969 | 5/1963 | Wiedeman......................... | 310/58 |
| 2,675,493 | 4/1954 | Grobel................................ | 310/53 |
| 3,318,253 | 5/1967 | Campolong........................ | 310/54 |

*Primary Examiner*—R. Skudy
*Attorney*—Curt M. Avery, Herbert L. Lerner et al.

[57] ABSTRACT

A liquid-cooled electric machine, such as a turbo-generator, has a stator with a multi-phase double-layer lap winding composed of winding portions, main current feed-throughs, and circuit connectors. The circuit connectors form electric circuit-group connections between the winding portions and also connect the winding portions with the feed-throughs. The stator comprises a liquid-coolant system which has two hydraulically parallel connected branch groups of coolant ducts. A first one of these duct groups extends through the multi-phase winding. The second branch group of ducts extends through the feed-throughs and the connectors. Insulating hose members form part of the second branch group and fluidically bridge each two of those connectors that have instantaneous potentials, i.e. have different electrical potentials or assertain to different phases. A plurality of hydraulically parallel cooling branches of the second group is formed by the hose members and those of said connectors that are electrically located between each two of the feed-throughs. The connectors form a ring conductor arrangement, and each of said cooling branches between two respective ones of said feed-throughs has a portion which extends through the geodetically topmost region of the arrangement. At least one insulating coolant discharge line is connected to this topmost portion, the coolant being conducted in the cooling branch between the two feed-throughs and the associated discharge line in double-stream fashion. A coolant collector tank with an internal gas cushion space is mounted geodetically above the topmost ring conductor portion. The coolant discharge line forms a riser communicating from below with said tank so as to pass not only coolant but, due to buoyancy, also entrained undissolved gas into the tank.

5 Claims, 5 Drawing Figures

United States Patent [19]
Beermann et al.
[11] 3,753,013
[45] Aug. 14, 1973
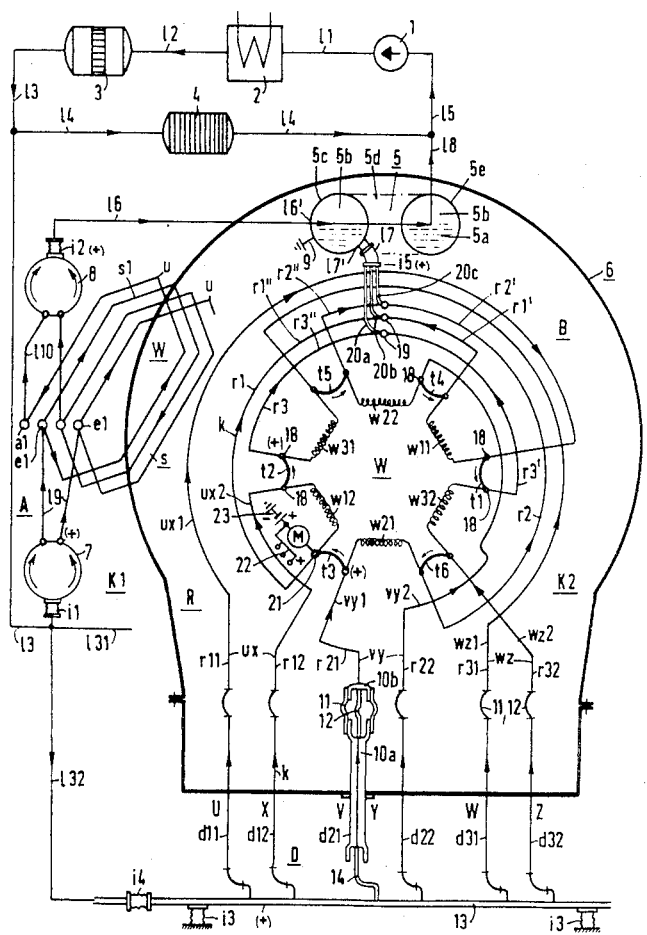

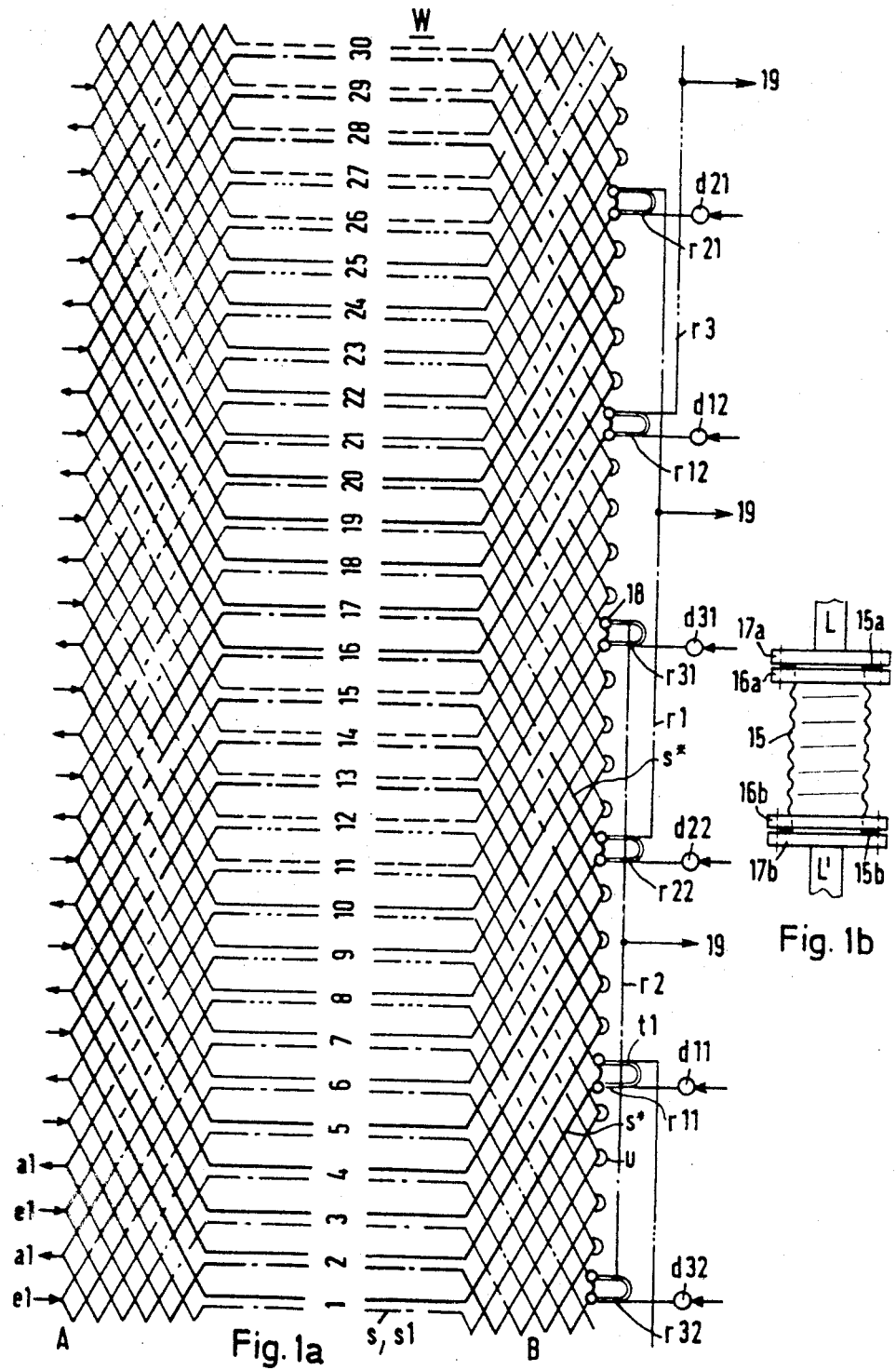

LIQUID-COOLED ELECTRIC MACHINE, PARTICULARLY TURBO-GENERATOR

Our invention relates to liquid-cooled electric machines, particularly those of high power rating, such as turbo-generators, whose stator winding is of the multiphase double-layer lap type connected to main current feed-throughs, and whose individual winding portions are connected with each other and with the feed-throughs by means of circuit connectors. The machine stator is provided with a liquid-cooling system which has two hydraulically parallel cooling branch groups. One of these branch groups is constituted by coolant ducts in the stator winding. The second branch group extends through respective ducts in the feed-throughs and the circuit connectors.

A liquid-cooled electric machine of this kind is known (German published Patent Application No. 1,184,852). It is essential that a liquid-cooling system of such a machine provides for direct cooling of not only the conductors of the winding but also of all other machine parts in which heat due to electric losses can be generated. For this reason, particularly the ring-shaped coolant connections, like the winding conductors, are designed as hollow conductors traversed by the flow of the cooling liquid. To afford passing the required quantity of coolant through the cooling duct cross sections per unit time, the coolant is not fed to the cooling ducts of the stator winding in series but is conducted within a separate cooling branch group through the ducts of the high-current feed-throughs and of the circuit connectors all the way to the junctions of the connectors at the stator winding.

In the known electric machine, the cooling ducts of the two main-current feed-throughs are always connected flow-wise in series, so that the cooling liquid flows upwardly through the respective cooling ducts from one main-current feed-through via the ring conductor parts of the connectors all the way to the junctions of the connectors at the stator winding and thence returns downhill to the other main-current feed-through via other ring conductor or connector parts connected to other peripheral points of the coil ends. Connector junctions which are at different potential or belong to different phases are fluidically bridged by hose sections of insulating material, so that relatively short pieces of insulating tubing result and the length of the connectors is kept within tolerable limits.

Due to the fact that the cooling liquid flows between the respective two main-current feed-throughs through the cooling ducts of the connectors first uphill and then downhill to the coolant exit, difficulties are encountered in that gas bubbles rise from the low coolant inlet or outlet to the topmost part of the cooling duct and can accumulate in the upper regions of the duct. This may impair the cooling effect unless provisions are made for reliably venting the cooling water flowing through the cooling ducts of the feed-throughs and of the connectors and insulating tubes. As is well known, protective gas components get into the stator coolant circulation because the stator housing is filled with protective gas of higher pressure than the pressure level of the cooling liquid. Consequently, the protective gas diffuses through the insulating tubing, usually of Teflon (tetrafluoroethylene), into the coolant circulation of the stator winding and into the circulation of the circuit connectors and feed-throughs. Protective gas or such gas as $H_2$ or $N_2$, for instance, may be contained in the cooling liquid also for the reason that the coolant should be saturated with these protective gases for excluding $O_2$ components which are undesirable in the coolant because of the danger of corrosion, and that a simple leak indication by measurement of the gas concentration is made possible in this manner. It is a principal object of our invention, therefore to prevent the danger of gas-bubble or gas-cushion formation as might impair the coolant flow in the circuit connectors and insulating tubing, in a reliable and simple manner and while preserving the applicability of a gas filling on the machine housing and the occurrence of gas components in the cooling liquid.

To this end, and in accordance with our invention, the cooling liquid is conducted within the second cooling branch group in such a manner that several parallel cooling branches of the second cooling group are formed by the circuit connectors situated between each two high-current feed-throughs; and the sections of insulating hose, which fluidically bridge different circuit connectors of instantaneously different potential, i.e. that may belong to different phases or have different voltages. Furthermore, the respective cooling branches provided between two high-current feed-throughs have at least one ring conductor section including the geodetically highest region of the ring conductor arrangement of the circuit connectors, to which section at least one insulating coolant discharge line is connected in such a manner that the coolant is conducted in the respective cooling branch between the two high-current feed-throughs and the associated discharge line in double-stream fashion, the coolant discharge line being designed as a twin line which opens into a coolant collecting tank with an internal gas cushion. The tank is arranged geodetically above the topmost ring conductor section. As a result, the discharge line rising from below up to the tank, passes not only the coolant but, due to buoyancy, also any undissolved gas into the tank.

By virtue of the invention the formation of gas bubbles or gas cushions at bends or in downhill connecting conductor sections is reliably prevented. At the same time, due to the double-stream conduction to the highest-situated discharge point, a more intensive cooling of the feed-throughs and circuit, connectors or ring conductors is accomplished. There result relatively short cooling paths within the connectors so that the flow resistance is relatively small. Furthermore, very short connections are obtained between the coolant discharge point and the collecting tank disposed in the upper peripheral region of the machine via the insulating discharge lines. An effective venting is secured by connecting the coolant discharge line to the respective highest tap point of the ring conductor section. Even if connectors or insulating hose sections are led downhill for short distances, the cooling is not impaired because the flowing liquid transports any here evolving gas bubbles to the upper tap point.

Depending on the selected flow velocity, and according to another feature of our invention, the coolant ducts of the circuit connectors and insulating hose sections situated between the connection of the coolant discharge line and the respective high-current feed-through, are preferably given a slope so as to avoid the formation of gas bubble traps. For the same reason it is preferable to avoid extreme bends in the line.

According to a preferred embodiment of the invention, the machine is provided with a three-phase stator winding in simple Y connection, and six high-current feed-throughs are associated in pairs with each stator winding circuit, external circuit connectors establishing the electrical connection between the high-current feed-through and one end of the winding circuit, whereas internal circuit connectors (group connectors) electrically connect respective parts of winding circuits turns or coils in series. The cooling liquid of the second cooling branch group is led in six parallel streams through the connector cooling ducts. Each individual stream flows through the series-connected cooling duct sections of a high-current feed-through, a circuit connector, an insulating hose section fluidically bridging the phase jump to the group circuit connector of another winding circuit, and of part of the highest-situated section of the ring conductor whence the flow stream reaches the connection of the coolant discharge line.

The invention is also applicable to machines with a multiphase, particularly three-phase, stator winding in multiple Y connection, for instance, double-Y connection. The coils situated diametrically opposite on the circumference of such a machine in double-Y connection are connected in parallel as is well known.

As to the electrical and coolant-wise connection of the circuit connectors with respect to the feed-throughs and the individual parts of the winding, care should be taken that as far as possible no current loops around the rotor axis are formed which would produce a magnetic field in the direction of the shaft axis, or that the magnetic fields of such current loops are mutually cancelled out, as otherwise a unipolar flux could develop in the region of the rotor bearing of the generator shaft. This particular problem assumes special significance for large turbo-generators in the power range of 400 MVA and more, to which our invention preferably relates. This significance is due to the fact that the unipolar voltages generated between the running surfaces of the rotor shaft and the bearing sleeves can cause currents that may damage or ultimately destroy the rotor bearings.

According to a further embodiment of our invention, a particularly advantageous arrangement and connection of the circuit connectors and ring-conductors, for the prevention of bearing currents caused by unipolar voltages, is provided by electrically connecting and arranging the circuit connectors between each two high-current feed-throughs of one of the respective winding circuits or winding phases, in such a manner that the current loop sections which are formed by the connectors and which produce a magnetic field in the direction of the rotor axis, extend excentrically to the rotor axis and in virtually bifilar fashion.

In the following the invention will be explained in further detail with the aid of the accompanying schematic drawings which exemplify two embodiments of the invention in simplified presentation, omitting parts not essential to the invention.

FIG. 1 shows diagrammatically an electric machine with a stator winding in a simple Y connection, and more specifically the appertaining coolant circulation system which comprises a first branch group for the stator winding of the electric machine on the one hand, and the second cooling branch group for the main-current feed-throughs and the circuit connectors on the other hand, for clarity, the ring conductor parts of the circuit connectors being represented not axially one behind the other (as seen in the direction of the axis of the machine), but are arranged concentrically to each other.

FIG. 1a is a development of the stator winding, the inlet and outlet points of the coolant being indicated at both end faces of the machine;

FIG. 1b is a view of a corrugated tube of insulating material with metal fittings at both ends, serving as an insulating section in the machine according to FIGS. 1 and 1a.

Figure 1:
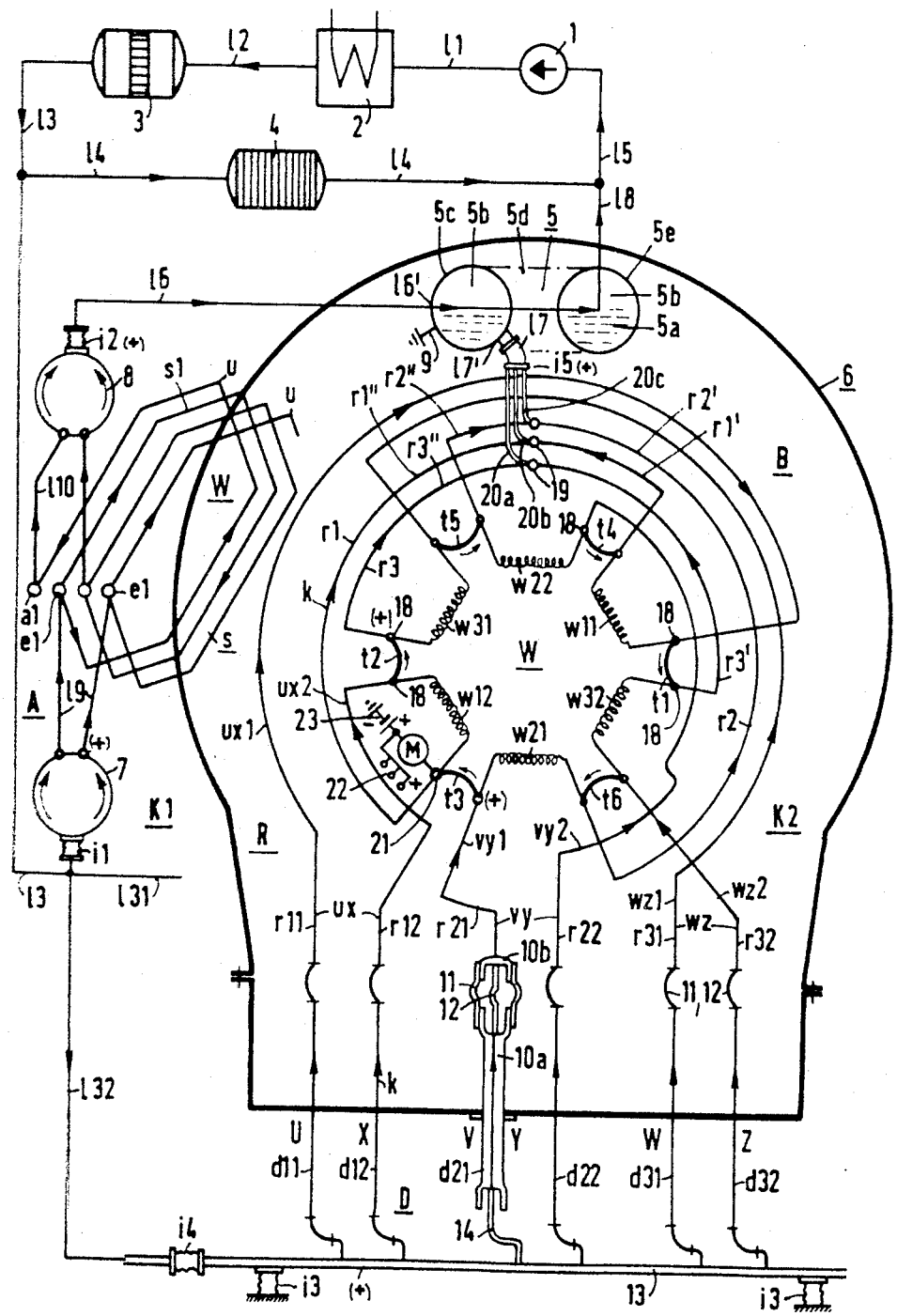
Figure 3:
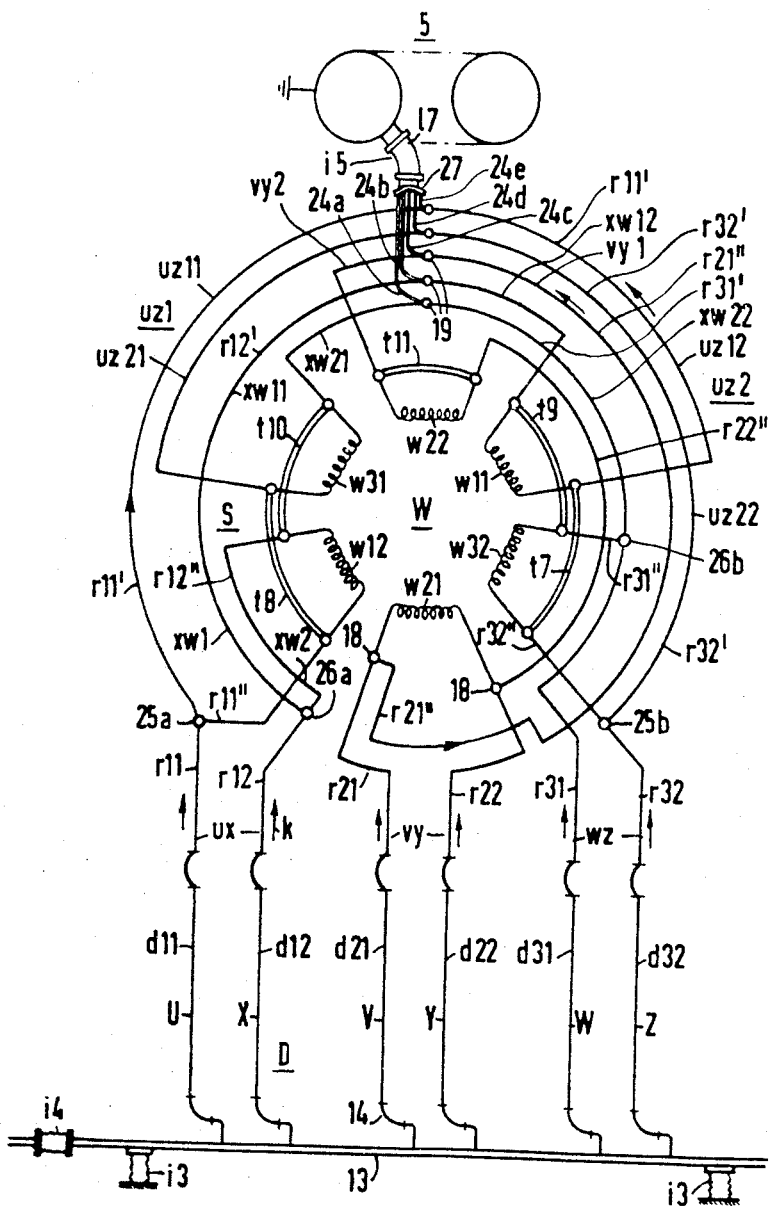

In contrast to FIG. 1, FIG. 3 shows diagrammatically a modified circuit connector arrangement of the second cooling branch group for a stator winding with double-Y connection.

The particular electric machine shown in FIG. 1 with a section of the cooling system for its stationary parts is a turbogenerator of high electrical power rating such as 400 MVA or more. The machine has two fluidically parallel cooling branch groups, namely a first branch group K1 for cooling the stator winding and K2 a second branch group for cooling the main current feed-throughs, generally designated with D, as well as of the circuit connectors, generally designated by R, which establish the circuit-group connection between the individual parts of the stator winding generally designated by W, and from the latter to the main current feed-throughs D. As shown in FIG. 1a, the stator winding W in this embodiment is a three-phase, double-layer lap winding. The cooling liquid is delivered by a pump 1, which may rotate with the rotor (not shown) or a stationary pump. The coolant flows through a line section $l_1$ to a heat exchanger 2 and thence via a line section $l_2$ through a fine filter 3 to the main supply line $l_3$. Part of the cooling liquid passes through a line branch $l_4$ and a filter bed 4, which usually contains an anion and cation exchanger for removal of $O_2$, $CO_3$, Cu and other undesirable ions from the cooling water. From filter bed 4, the coolant returns through a line section $l_5$ to the pump 1.

The above-mentioned pumping, cooling and processing 1 to 4 furnish treated and cooled cooling water to the main supply line $l_3$ from which the water passes on the one hand, through the cooling branch group K1 of the stator winding and, on the other hand, through the second cooling branch group K2. Hydraulically the two branch groups are connected in parallel. The warm water, leaving the two cooling branch groups, passes through line sections $l_6$ and $l_7$, respectively, to a collecting tank 5 which is arranged in the upper part of the machine housing and in principle has approximately the shape of a U. (Connection points $l_6'$, $l_7'$). The collecting tank 5 has a space 5a for the liquid and a gas space 5b arranged above it, hydrogen being preferably present as the inert gas in the gas space. The liquid pumped into the leg 5c of the collecting tank 5 flows, countercurrentwise to the gas entering into the gas space 5b, through an interconnecting piece 5d to the other tank leg 5e. From leg 5e, the water is drawn off, saturated with gas, by the pump 1 via a line $l_8$. This line $l_8$ therefore, is the main outlet line for the cooling liquid.

The contour line 6 represents the outer contour of the electric machine. The stator winding W is indicated in the left-hand part of FIG. 1 in perspective with but a few turns, in order to show the coolant flow within the stator winding. The stator winding W extends from the end face A of the machine (drive side) to the end face B of the machine (exciter side). The circuit connector arrangement R is disposed on side B of the machine. The cooling liquid is fed by a ring-shaped manifold arrangement 7, shown symbolically and on a reduced scale, which coolant-wise is connected by the line $l_3$ via an insulator $i_1$ to the inlet points $e_1$ disposed in the region of the end turns at face A of the machine. This connection comprises line sections $l_9$ insulating hoses preferably of Teflon. The inlet points $e_1$ serve as the electrical and coolant connection of the individual stator winding conductors $s$ (upper and lower conductor rods) which are interconnected to form the winding turns $s_1$. After flowing through one winding turn $s_1$ the cooling liquid reaches a coolant discharge point $a_1$ near the periphery and thence passes, through discharge lines $l_{10}$ containing insulating hose sections, to a ring-shaped discharge manifold 8 on the same end face of the machine.

From discharge manifold 8 the cooling liquid passes through a further insulator $i_t$ to the line $l_6$ and from there to the collecting tank 5, which is at ground potential, as indicated at 9. At the end face B of the machine the individual stator winding conductors $s$ of a winding turn $s_l$ are connected by a connector $u$ (not shown in detail) which serves to change the flow direction and to also form an electrical connection. The electrical and coolant circuits of the stator winding with their connection points $e1$, $a1$ and $u$ are shown in detail in FIG. 1a.

In the embodiment of FIG. 1 the stator winding W, a three-phase double-layer lap winding in simple Y connection, is connected together with the six feed-throughs $d11$, $d12$, $d21$, $d22$, $d31$, $d32$. Such a feed-through is schematically indicated at $d21$. It has two parts 10a and 10b for conducting the electric current and the cooling liquid, which are enclosed by a hollow, cylindrical insulator (not shown in detail). Part 10a extends through the wall of the housing 6 and is connected with the latter. Part 10b is connected with the circuit connector arrangement R; to compensate for different thermal movements between the parts 10a and 10b, the latter being connected together via flexible conductor ribbons 11 and correspondingly flexible hose sections 12. Flexible, insulating hose sections for the supply of the coolant from a manifold 13 to the respective feed-throughs are designated by 14. The distribution line 13 is supported against its base by suitable insulators $i3'$ and is connected coolant-wise via the inserted insulating section $i4$, with the main supply line $l_3$, as is the line $l_{31}$ of the first cooling branch group K1.

In principle, the insulating section $i4$, the insulating sections $i1$, $i2$ and the insulating section $i5$, further described below, are designed as shown in FIG. 1b. They contain a flexible, corrugated tube 15, preferably of Teflon, which is tightly connected at both ends 15a, 15b by flange bodies 16a, 16b to two flanges 17a, 17b of the lines L, L' which are to be interconnected by the insulating section $i5$.

In the embodiment of FIG. 1, the electrical connection between the main current feed-throughs and the stator winding W is such that always two winding circuit halves or coils, $w11$ and $w12$, $w21$ and $w22$, $w31$ and $w32$, respectively, are interconnected by a ring conductor section $r1$, $r2$ or $r3$ to form a winding circuit; and these three winding circuits or winding phases are connected at their two ends by two external circuit connectors to the corresponding pair of feed-throughs. Specifically, the series circuit $w11$ - $r1$ - $w22$ (phases U, X) is connected by the connectors $r11$, $r12$ to the main current feed-throughs $d11$, $d12$; the series circuit $w21$ - $r2$ - $w22$ (phases V, Y) is connected by connectors $r21$, $r22$ to the main current feed-throughs $d21$, $d22$; and the series circuit $w31$ - $r3$ - $w32$ (phases W, Z) is connected through connectors $r1$, $r2$ to the main current feed-throughs $d31$, $d32$.

The connections $r1$, $r2$, $r3$ are internal circuit connectors, i.e., they serve to connect two coils or circuit halves belonging to one winding circuit in series and are therefore designated as group circuit connectors. The phase symbols U, V, W; X, Y, Z are shown also at the main current feed-throughs for the sake of clarity. The individual circuit halves $w11$, $w12$ etc. are indicated only symbolically in the central part of FIG. 1; their exact mutual relation is shown in the development according to FIG. 1a, where the external and internal circuit connections, the association of the individual phases with their feed-throughs $d11$, $d12$, etc. as well as the phase designations U, V, etc. are entered, the phase designations applying to counter-clockwise rotation from the drive side A.

In addition to the high-current feed-throughs D, the circuit connectors and ring conductors, respectively, generally designated by R, are also provided with internal coolant ducts extending all the way to their junctions 18, relative to the stator winding W and relative to the respective connection rods $s^x$ (see FIG. 1a).

The flow of the cooling water is shown in FIG. 1 by the arrows $k$. For instance, the water flows from the cooling ducts of the main current feed-through $d11$ through the cooling ducts of the connector $r11$ all the way to the junctions 18 at the winding $w11$, from here via an insulating hose section $t1$, preferably consisting of PTFE or teflon (polytetrafluor-ethylene) to the junction 18 of the ring line $r3$ for winding $w32$ and from here via a first partial section $r3'$ of the last-mentioned ring line to the connection 19 of a coolant discharge line 20a. The path of the cooling water from the other main current feed-through $d12$ of the same winding circuit extends similarly through the respective cooling ducts of the circuit connector $r12$ all the way to its junction 18 with the winding $w12$, thence via the insulating hose section $t2$ to the internal connector $r3$ and via the other partial section $r3''$ of this connector to the junction 19 of the coolant discharge line 20a.

It will be seen that the insulating hose sections $t1$, $t2$ and analogously the other insulating hose sections $t3$ to $t6$ bridge coolant-wise respective circuit connectors of different phases and potentials in such a manner that very short lengths of the connecting sections and hence of the coolant paths are secured. The path of the coolant from the main current feed-through pairs $d21$ - $d22$ and $d31$ - $d32$ to the corresponding connections 19 of the coolant discharge lines 20b and 20c, respectively, is analogous to the coolant path described above between the feed-throughs $d11$, $d12$ on the one hand, and the connection 19 of the coolant discharge line 20a on the other hand, i.e. the cooling branches $ux$, $vy$, $wz$, provided between each of two high-current feedthroughs $d11$ - $d12$ and $d21$ - $d22$ and $d31$ - $d32$, respectively, each exhibit at least one ring conductor section $r1$, $r2$ or $r3$, which includes the geodetically highest region of the ring conductor arrangement of the circuit connectors R and to which at least one insulating coolant discharge line $20a$, $20b$ or $20c$ is connected in such a manner that the coolant in the respective cooling branch between the two high-current feed-throughs and the associated discharge line $20a$, $20b$, $20c$ is conducted in double-stream fashion. (Streams $ux1$, $ux2$; $vy1$, $vy2$; $wz1$, $wz2$, respectively). The respective discharge lines $20a$, $20b$, $20c$ are designed as risers and communicate with the coolant collecting tank 5 located above the highest-situated ring conductor section $r1$, $r2$, $r3$, respectively. As mentioned, the tank 5 has a gas space or gas cushion $5b$ so that, aside from the coolant coming from one circuit connector cooling ducts, the undissolved gas components contained in the coolant can also enter into the tank 5 due to their buoyancy.

The three discharge lines $20a$, $20b$, $20c$ are connected to a common compensator is designed as already explained in connection with FIG. $1b$. The other end of compensator $i5$ is connected with the line $l_7$ which opens into the collecting tank 5. If desired, several compensators $i5$, one for each discharge line, may be provided. As shown, the coolant ducts of the circuit connectors R situated between the respective connection 19 of the discharge lines $20a$, $20b$ and $20c$ and the respective high-current feed-through D and the insulating hose sections $t1$ to $t6$, are given a slope which prevents the formation of gas traps. A slight slope for the cooling water, such as that of the circuit connectors $r11$ and $r3$, before the coolant is again conducted uphill to the connection points 19, is not detrimental if extreme bends are avoided, as along these relatively short downhill sections the coolant is capable, at sufficient flow velocity, to entrain all gas components.

Figure 2:
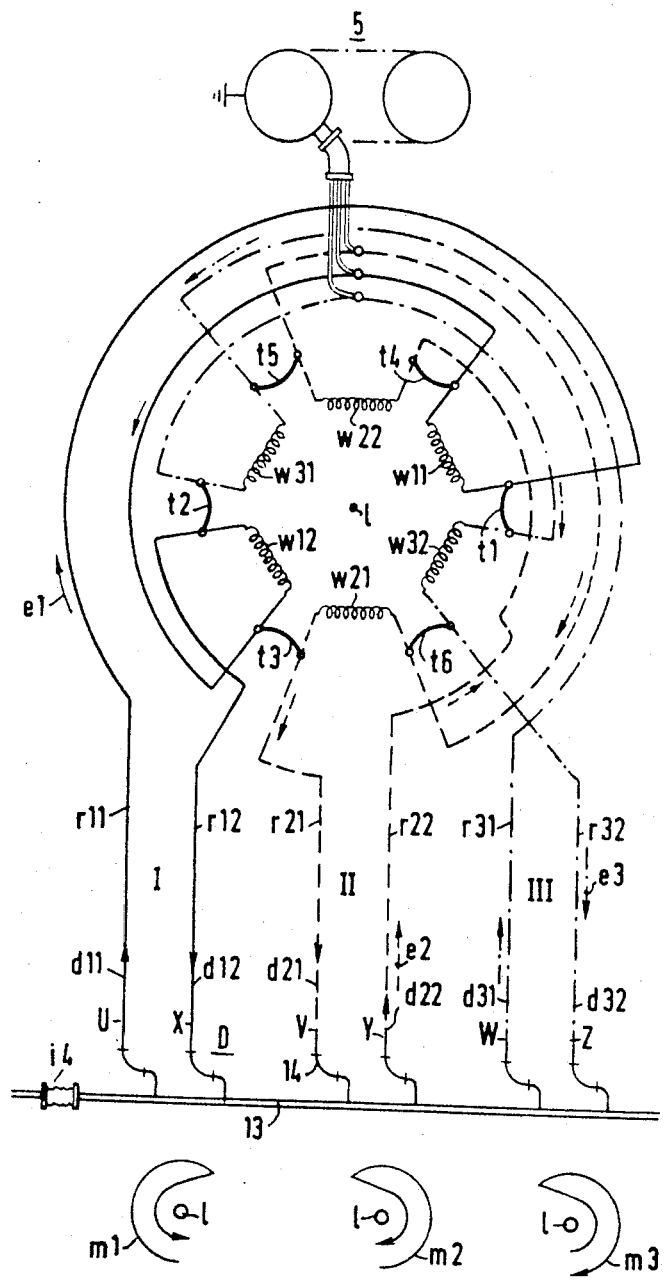
FIG. 2 is a section of FIG. 1 with the circuit connector arrangement at one end face of the machine, the electric circuit being shown within the current loop sections.

As can be seen from FIG. 2, the circuit connectors situated between each two high-current feed-throughs $d11$ - $d12$, $d21$ - $d22$, $d31$ - $d32$, respectively, associated with one winding circuit or winding phase, are electrically connected and arranged so that the current loop parts $m1$, $m2$, $m3$ formed by the respective connectors and producing a magnetization in the direction of the rotor axis 1, extend excentrically to the rotor axis and are virtually bifilar, this being indicated schematically in the lower part of FIG. 2 by curved arrows giving the direction of the current relative to the shaft.

In the upper part of FIG. 2, which, although greatly simplified, corresponds to FIG. 1, the directions of current flow in the three winding phases I, II, III prevailing at a given instant are shown by solid lines and arrows $e1$ for the feed-throughs, connectors and windings of the winding phase I. The current flow lines and direction for the winding phase II are shown by dashed lines; and the conductors and arrows indicative of the current flow direction of the winding phase III are shown by dot-dashed lines. A comparison between the upper and lower parts of FIG. 2 thus permits recognizing the current direction and the correlated arrangement of the connectors and ring conductors, the same reference characters being applied in FIGS. 1 and 2 for corresponding elements respectively.

In FIG. 1 each of the highest-situated ring conductor sections $r1$, $r2$, $r3$, to which the coolant discharge lines 20 to $20b$ are connected, is subdivided by connecting points 19 into two circuit connector or ring conductor sections $r1'$ and $r1''$, $r2'$ and $r2''$, $r3'$ and $r3''$, respectively. The flow of the coolant is in opposite directions in the two line sections subdivided by the connecting point 19. Hence, there is a double flow from two directions toward the connecting point 19. Within the two cooling branch groups K1, K2, the supply distribution line 7 and the discharge manifold 8, as well as the supply distribution line 13 and the discharge manifold arrangement $20a$, $20b$, $20c$, are coolant-wise connected with the cooling branch parts at ground potential via the above-mentioned insulating sections with metal fittings in the form of compensators, corrugated tubing and the like $i1$, $i2$, $i3$, $i4$, $i5$. This has the purpose that, with the cooling branches filled with water, a precise insulation test of a stator winding phase or a winding circuit can be performed. This is because the other winding circuits and cooling branch parts, through which the current for measuring instrument M, serving to indicate leakage current or insulating resistance, is not supposed to flow, can be brought to the same potential (+), different from ground potential, at the voltage terminal 21 to which the winding to be measured by instrument M is connected. For illustration, the plus terminal 21 of the voltage source 23 is connected in FIG. 1 to the one end of the winding $w12$ via the measuring instrument, an ammeter or ohmmeter, the minus terminal of the voltage source 23 being grounded. The leakage current flowing to ground through the insulation, and therefore the regular condition of the winding insulation, can now be read at the measuring instrument. However, all of those winding circuit connectors and cooling branches whose leakage currents would falsify the measurement, are also connected to plus potential via further plus terminals 22. Hence such leakage current is not conducted through the measuring instrument M and cannot falsify the measuring result.

The plus terminals are shown connected to the connector-winding junctions 18 of the windings $w31$ and $w21$ or to the feed-throughs $d21$, $d22$, $d31$, $d32$, as well as to the fitting of the insulating section $i5$. As will be seen, this insulating section makes it possible to connect to plus potential the fitting of the insulating section $i5$, which faces away from the coolant collecting tank 5. Similarly, the supply line 13 to the current feed-throughs, which is suspended insulated and is separated from ground potential by an insulating section $i4$, is connected to ground potential. In the left-hand part of FIG. 2, the same possibility of measurement is indicated, in order to illustrate that the distribution line 7 and the manifold 8 also must be connected to plus potential at the end face A of the machine, the insulating sections $i1$, $i2$ serving the same purpose as the insulating sections $i5$.

In FIG. 3 the stator winding W is shown double-Y connected electrically with the feed-throughs D by its circuit connectors. Two diametrically opposite windings $w11$ and $w12$, $w21$ and $w22$, $w31$ and $w32$, respectively, are connected in parallel to the corresponding pairs of feed-throughs $d11$ - $d12$, $d21$ - $d22$, $d31$ - $d32$. Each of the cooling branches $ux$, $zw$ and $vy$ between two high-current feed-throughs of the circuit connectors are provided approximately in the middle region of their cooling path lengths, with highest-situated ring conductor section $r31'$, $r12'$ $r21''$, $r32'$ and $r11'$. Each of these ring conductor sections has a connection point 19 approachable by two streams and has at least one each coolant discharge line 24a, 24b, 24c, 24d, 24e. Here, the respective coolant streams belonging to one connection point 19 are not in all cases associated to two feed-throughs for the same winding piece; rather, two cooling branches $uz1$, $uz2$, for instance, are situated between the feed-throughs $d11$ and $d32$. The one branch $uz1$ extends from the circuit connector $r11$ of the feed-through $d11$, through the junction 25a and the ring conductor $r11'$, to the connection point 19 of the discharge line 24e and from there via the second section of the ring conductor $r11'$ to the insulating hose section $t7$, and through this insulating hose section via the circuit connector $r32''$ and the junction point 25b to the circuit connector $r32$ of the feed-through $d32$. Another cooling branch hydraulically parallel to the above-mentioned cooling branch extends between the branch points 25a and 25b of the circuit connectors $r11$ and $r32$ via the circuit connector $r11'$, the insulating tubing $t6$ to the circuit connector $r32'$ and to a connection point 19 of the discharge line 24d, and from there through the remaining section of the circuit connector $r32'$ to the connection point 25b. These two circuit connector cooling branches $uz1$ and $uz2$ are therefore subdivided by the connection point 19 with discharge lines 24d, 24e into four coolant streams $uz11$, $uz12$, $uz21$, $uz22$. Analogously obtained for the two cooling branches $xw1$ and $xw2$ between the feed-throughs $d12$ and $d31$, with the insulating tubes $t9$ and $t10$, are four coolant streams $xw11$, $xw12$, $xw21$ and $xw22$. An insulating hose section $t9$ is arranged in the stream $xw12$, and an insulating hose section $t10$ in the stream $xw\,21$. The branching points of the circuit connectors $r12$ and $r31$ are denoted by 26a and 26b, respectively.

As the circuit connectors $r21$ and $r22$, associated with the feed-throughs $d21$ and $d22$, are brought directly to the connection points 18 of the winding $w21$, a cooling branch $vy$ is obtained between these two connection points 18. More specifically, the branch $vy$ extends through the ring conductor $r21''$ all the way to the connection point 19 of the discharge line 24c and thence through the other section of the ring conductor $r21''$ and via the insulating hose section $t11$ to the ring conductor $r22''$ and back to the other connection point 18. This cooling branch is accordingly subdivided by the connection point 19 of the discharge line 24c into two streams $vy1$ and $vy2$. The direction of flow of the coolant is indicated by arrows k.

It will be seen that all ring conductor sections including the highest-situated region of the ring conductor arrangement S, are each provided with a connection 19 of the discharge line arrangement 24a to 24e. In this embodiment provision is made to keep the coolant paths as short as possible. To this end, parts of circuit connectors or ring conductors belonging to different phases or being at different potentials, are connected coolant-wise with each other by the insulating hose sections $t7$ to $t11$. In the embodiment of FIG. 3 there are thus obtained six parallel main treams $uz1$, $xw1$, $xy1$, $vy2$, $xw2$, $uz2$ of the coolant in the region of the six high-current feed-throughs. This, on the basis of the electrical parallel connection of the winding parts, results in more mutually parallel coolant streams of the circuit connectors than in the embodiment of FIG. 1. That is, the embodiment of FIG. 3 has 10 parallel streams $uz11$, $uz12$, $uz21$, $uz22$, $vy1$, $vy2$, $xw11$, $xw12$, $xw21$ and 22. The individual discharge lines 24a to 24e open into a manifold 27 which is connected to the line $l_7$ containing the insulating section $i5$. Otherwise, the reference characters in FIG. 3 correspond to those of FIG. 1 for corresponding elements respectively. The arrangement and mode of operation are analogous to those of the embodiment according to FIG. 1.

Upon a study of this disclosure it will be obvious to those skilled in the art that the invention disclosed herein can be modified in various ways and may be given embodiments other than those illustrated and described herein, without departing from the essential features of our invention and within the scope of the claims annexed thereto.

We claim:

1. A liquid-cooled electric machine having a three-phase stator winding in simple Y connection, such as a turbo-generator, with a stator having a multi-phase double-layer lap winding composed of winding portions, main current feed-throughs, six of said feed-throughs being associated in pairs with each one of said stator winding circuits, and circuit connectors which form electric circuit group connections between said winding portions and which connect said winding portions with said feed-throughs, said stator comprising a liquid-coolant system having two hydraulically parallel connected branch groups of coolant ducts of which a first one extends through said multi-phase winding, the second branch group extending through said feed-throughs and said connectors, insulating hose members forming part of said second branch group and fluidically bridging each two of said connectors that have different instantaneous electrical potentials respectively, a plurality of hydraulically parallel cooling branches of said second group being formed by said hose members of those of said connectors that are electrically located between each two of said feed-throughs, said connectors forming a ring conductor arrangement, each of said cooling branches between two respective ones of said feed-throughs having a portion extending through the geodetically topmost region of said arrangement, at least one insulating coolant discharge line connected to said topmost portion, a coolant collector tank with a gas cushion space mounted geodetically above said topmost ring conductor portion, said coolant discharge line forming a riser communicating from below with said tank so that said riser conducts into said tank not only coolant but, due to buoyancy, also entrained undissolved gas, said circuit connectors comprising external terminal connectors which establish the electrical connection between said feedthroughs and an end of the winding circuit, and internal circuit-group connectors which electrically series connect respective parts of said windings, said second cooling branch group forming six hydraulically parallel flow paths through the cooling ducts of the connectors, each individual one of said six paths extending through the series-connected cooling ducts of a feed-through, a circuit connector, an insulating hose section fluidically bridging the phase jump to the group circuit connector of another circuit of the winding, and thence through part of said topmost portion of said ring conductor to the cooling discharge line.

2. A liquid-cooled electric machine having a three-phase stator winding in double-Y connection, such as a turbo-generator, with a stator having a multi-phase double-layer lap winding composed of winding portions, main current feed-throughs, six of said feedthroughs being pairwise associated with each of the stator winding phases, and circuit connectors which form electric circuit group connections between said winding portions and which connect said winding portions with said feed-throughs, said stator comprising a liquid-coolant system having two hydraulically parallel connected branch groups of coolant ducts of which a first one extends through said multi-phase winding, the second branch group extending through said feed-throughs and said connectors, insulating hose members forming part of said second branch group and fluidically bridging each two of said connectors that have different instantaneous electrical potentials respectively, a plurality of hydraulically parallel cooling branches of said second group being formed by said hose members of those of said connectors that are electrically located between each two of said feed-throughs, said connectors forming a ring conductor arrangement, each of said cooling branches between two respective ones of said feed-throughs having a portion extending through the geodetically topmost region of said arrangement, at least one insulating coolant discharge line connected to said topmost portion, a coolant collector tank with a gas cushion space mounted geodetically above said topmost ring conductor portion, said coolant discharge line forming a riser communicating from below with said tank so that said riser conducts into said tank not only coolant but, due to buoyancy, also entrained undissolved gas, the cooling branches of the circuit connectors between each two of said feed-throughs having approximately in the middle of their cooling-duct length a topmost ring conductor portion, at least one coolant discharge line connected to said topmost portion so that at least one pair of coolant stream paths is formed, one path of each pair passing directly via a circuit connector cooling duct to a connection point of said coolant discharge line, and one of each of said path pairs extending to said connection point through insulating hose members that fluidically interconnect connectors of different phases or different potentials.

3. A liquid-cooled electric machine, such as a turbo-generator, with a stator having a multi-phase double-layer lap winding composed of winding portions, main current feed-throughs, and circuit connectors which form electric circuit group connections between said winding portions and which connect said winding portions with said feed-throughs, said stator comprising a liquid-coolant system having two hydraulically parallel connected branch groups of coolant ducts of which a first one extends through said multi-phase winding, the second branch group extending through said feed-throughs and said connectors, insulating hose members forming part of said second branch group and fluidically bridging each two of said connectors that have different instantaneous electrical potentials respectively, a plurality of hydraulically parallel cooling branches of said second group being formed by said hose members of those of said connectors that are electrically located between each two of said feed-throughs, said connectors forming a ring conductor arrangement, each of said cooling branches between two respective ones of said feed-throughs having a portion extending through the geodetically topmost region of said arrangement, at least one insulating coolant discharge line connected to said topmost portion, a coolant collector tank with a gas cushion space mounted geodetically above said topmost ring conductor portion, said coolant discharge line forming a riser communicating from below with said tank so that said riser conducts into said tank not only coolant but, due to buoyancy, also entrained undissolved gas, each of said two cooling branch groups comprising a supply distribution line, a discharge manifold and insulating duct members with metal fittings which connect said supply distribution line and said manifold with cooling branch parts at ground potential so as to permit, with the cooling branches filled with water, an insulation test of one stator winding when other winding circuits or cooling branch parts not supposed to conduct testing current are held at the measuring potential different from ground potential.

4. In a machine according to claim 3, said insulating duct members forming resilient compensators.

5. In a machine according to claim 3, said insulating duct members being formed of corrugated bellons tubing.

* * * * *